(12) United States Patent
van Der Stockt et al.

(10) Patent No.: US 11,243,853 B2
(45) Date of Patent: Feb. 8, 2022

(54) SERVICE RETRY COLLISION PREVENTION USING PRIME NUMBERS

(71) Applicant: International Business Machines Corporation, Armonk, NY (US)

(72) Inventors: Stefan A. G. van Der Stockt, Austin, TX (US); Joseph Lindsey Sharpe, III, Waxhaw, NC (US); Xinyun Zhao, Cedar Park, TX (US); Sihang Bob Fang, Culver City, CA (US); Manali Jairam Chanchlani, Redmond, WA (US); Rahul P. Akolkar, Lexington, KY (US); Sai Karthik Reddy Ginni, New York, NY (US); Kristi Farinelli, Albrightsville, PA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 16/695,243

(22) Filed: Nov. 26, 2019

(65) Prior Publication Data

US 2021/0157688 A1 May 27, 2021

(51) Int. Cl.
*G06F 15/173* (2006.01)
*G06F 11/14* (2006.01)
*H04L 12/24* (2006.01)
*H04L 29/06* (2006.01)
*H04L 29/08* (2006.01)

(52) U.S. Cl.
CPC ......... *G06F 11/1474* (2013.01); *H04L 41/06* (2013.01); *G06F 2201/805* (2013.01); *H04L 67/02* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 5,287,537 A * | 2/1994 | Newmark | G06F 12/0207 711/E12.003 |
| 7,206,319 B2 | 4/2007 | Li | |
| 7,826,797 B2 | 11/2010 | Niwano | |
| 8,773,242 B2 | 7/2014 | Park | |
| 2017/0154042 A1 | 6/2017 | Meyer | |
| 2017/0371950 A1 | 12/2017 | Perna | |
| 2019/0243747 A1* | 8/2019 | Ross | G06F 11/3495 |

FOREIGN PATENT DOCUMENTS

| | | |
|---|---|---|
| JP | 2685035 B2 | 12/1997 |
| KR | 100644582 B1 | 11/2006 |
| KR | 101046791 B1 | 6/2011 |
| WO | 2017092785 A1 | 6/2017 |

* cited by examiner

*Primary Examiner* — Phuoc H Nguyen
(74) *Attorney, Agent, or Firm* — David B. Woycechowsky

(57) ABSTRACT

Technology for determining an amount of time to wait to retry requests to a representational state transfer (REST) server system for a REST resource, where the time to wait is always chosen to be a prime number of time units (for example, slots, milliseconds). While currently conventional systems will sometimes use a prime number of time units to wait for a retry request, various embodiments of the present invention will always, and invariably, use a prime number of time units. The REST resource may be, for example, a REST application programming interface (API) that is requested by and delivered to a client system using hypertext transfer protocol (HTTP).

19 Claims, 2 Drawing Sheets

SERVICE RETRY COLLISION PREVENTION USING PRIME NUMBERS

BACKGROUND

The present invention relates generally to the field of network REST (representational state transfer) API (application programming interface) retry logic.

The concept of a "networking level" (specifically an "API (application programming interface) level") is known. An API level includes REST (representational state transfer) API endpoints. As one example of REST APIs in action, machine learning (ML) models are typically exposed by a server computer to various client devices as REST API endpoints. An ML model is typically called by providing input data (for example, a banking client's attributes) and the ML model responds with a classification or regression answer. REST APIs expose a model as a service that external applications can call across the network.

To be deemed a REST service, the API has to fulfill the following five (5) architecture guiding principles: (i) client-server principle, meaning separating the user interface concerns from the data storage concerns, and thereby improving the portability of the user interface across multiple platforms and also improving scalability by simplifying the server components; (ii) stateless principle, meaning that a request from client to server must contain all of the information necessary to understand the request, and cannot take advantage of any stored context on the server—session state is therefore kept entirely on the client; (iii) cachable principle, meaning that cache constraints require that the data within a response to a request be implicitly or explicitly labeled as cacheable or non-cacheable—if a response is cacheable, then a client cache is given the right to reuse that response data for later, equivalent requests; (iv) uniform interface, meaning that by applying the software engineering principle of generality to the component interface, the overall system architecture is simplified and the visibility of interactions is improved—in order to obtain a uniform interface, multiple architectural constraints are needed to guide the behavior of components (it is noted that REST is defined by four interface constraints: identification of resources; manipulation of resources through representations; self-descriptive messages; and, hypermedia as the engine of application state; and (v) layered system principle, meaning that the system style allows an architecture to be composed of hierarchical layers by constraining component behavior such that each component cannot "see" beyond the immediate layer with which they are interacting. The API will also typically follow the code on demand principle, meaning that REST allows client functionality to be extended by downloading and executing code in the form of applets or scripts—this simplifies clients by reducing the number of features required to be pre-implemented.

A REST API typically encapsulates a single model. Practitioners call the model with input data and receive a response from the REST service (that is, model output). Usually there are not problems in calling a REST service. If a client device calls the REST service, the REST service will answer in an overwhelming majority of service call instances. But because the REST API runs on a server with finite resources, there comes a point where many client devices calling the REST server at the same time will cause the server to be unable to answer all of the service calls (sometimes herein referred to as "requests"). This causes time-out ("server busy") errors. REST API controllers will typically detect that a request was unsuccessful, and, in response to detecting that the request was unsuccessful, try again with a renewed service call. The renewed service call might succeed, or might fail as well. "Network API retry logic" (also sometimes referred to as "service retry collision prevention") is a term used to collectively referred to all the strategies and steps taken to resolve this issue. This includes the number of times to retry a particular request, the amount of time to wait before retrying again (since waiting might cause the server to be less busy), and any other logic around deciding how best to manage retrying a request. Network API retry logic is conventionally set by some kind of policy ("logic"). There are a number of types of existing network API retry logic, including: fixed period retry, exponential back-off retry, linear back-off retry, Decorr type, equal jitter type and full jitter type.

SUMMARY

According to an aspect of the present invention, there is a method, computer program product and/or system that performs the following operations (not necessarily in the following order): (i) receiving, from a REST server system, a plurality of representation state transfer (REST) resource fail notification, with each REST resource fail notification corresponding to an REST resource request that failed; and (ii) for each given REST resource fail notification of the plurality of REST resource fail notifications: (a) determining a respectively associated delay time for the given REST resource fail notification, with all delay times being determined to be a number of time units that is a prime number, (b) delaying, for the respectively associated delay time, sending a REST resource retry request corresponding to the given REST resource fail notification, and (c) subsequent to the delaying of the sending of the REST resource retry request corresponding to the given REST resource fail notification, sending, to the REST server system, the REST resource retry request corresponding to the given REST resource fail notification.

According to a further aspect of the present invention, there is a method, computer program product and/or system that performs the following operations (not necessarily in the following order): (i) receiving, from a REST server system, a first representation state transfer (REST) resource fail notification corresponding to a first REST resource request that failed; (ii) receiving a prime number set including a plurality of prime numbers, wherein the prime number set does not include any composite numbers; (iii) selecting a selected prime number from the prime number set; (iv) delaying, for the selected prime number of time units, sending a first REST resource retry request corresponding to the first REST fail notification; and (v) subsequent to the delaying of the sending of the first REST resource retry request, sending, to the REST server system, the first REST resource retry request.

According to a further aspect of the present invention, there is a method, computer program product and/or system that performs the following operations (not necessarily in the following order): (i) receiving, from a REST server system, a first representation state transfer (REST) resource fail notification corresponding to a first REST resource request that failed; (ii) applying machine logic to select a selected number with the machine logic being structured and/or programmed so that the selected number necessarily being a prime number; (iii) delaying, for the selected number of time units, sending a first REST resource retry request corresponding to the first REST resource fail notification; and (iv) subsequent to the delaying of the sending of the first REST resource retry request, sending, to a REST server system, the first REST resource retry request.

DETAILED DESCRIPTION

Figure 1:
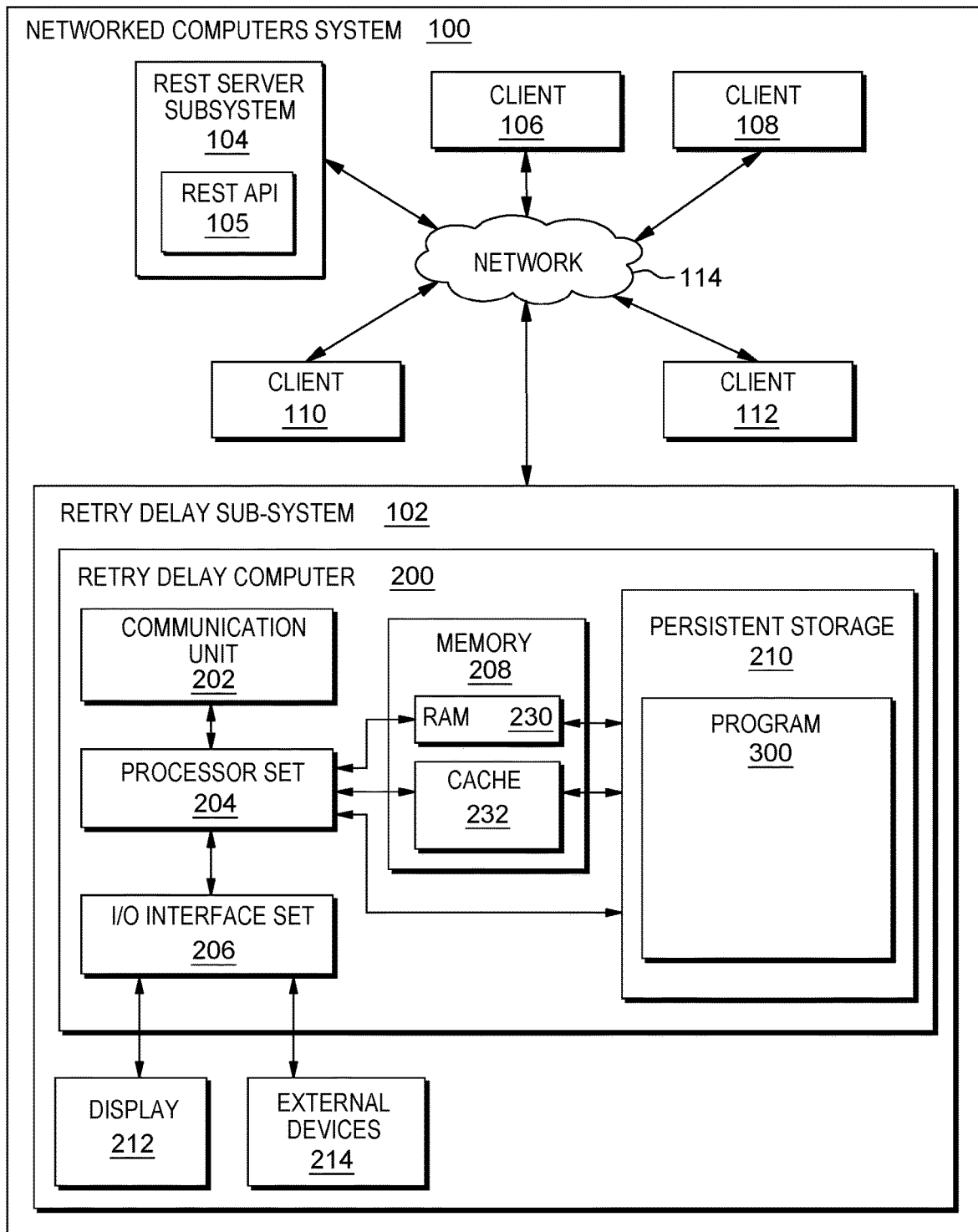
FIG. 1 is a block diagram view of a first embodiment of a system according to the present invention.

Some embodiments of the present invention are directed to technology for determining an amount of time to wait to retry requests to a representational state transfer (REST) server system for a REST resource, where the time to wait is always chosen to be a prime number of time units (for example, slots, milliseconds). While currently conventional systems will sometimes use a prime number of time units to wait for a retry request, various embodiments of the present invention will always, and invariably, use a prime number of time units. Currently conventional systems typically use random numbers that will contain a mix of primes and non-primes. Odds are that some primes will get selected part of the time, and the odds depend on the (number of primes in set)/(total numbers in set), which is typically low—there are far fewer primes than non-primes. In any reasonable number set (that is, numbers between 0 to 1000 milliseconds will have more non-prime delay durations than prime delay durations. The REST resource may be, for example, a REST application programming interface (API) that is requested by and delivered to a client system using hypertext transfer protocol (HTTP).

REST API logic can encompass more than just an ML model.

Retry logic can sit either on the client side ("edge") or in some intermediary between the client and server. For example, in the embodiment of FIGS. 1 to 3 (to be discussed, below), the retry logic is an intermediary machine that is on the communication path of communications between the clients and the server.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: retry delay subsystem 102 (sometimes herein referred to, more simply, as subsystem 102); REST server subsystem 104, REST API 105, client subsystems 106, 108, 110, 112; and communication network 114. Retry delay subsystem 102 includes: retry delay computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
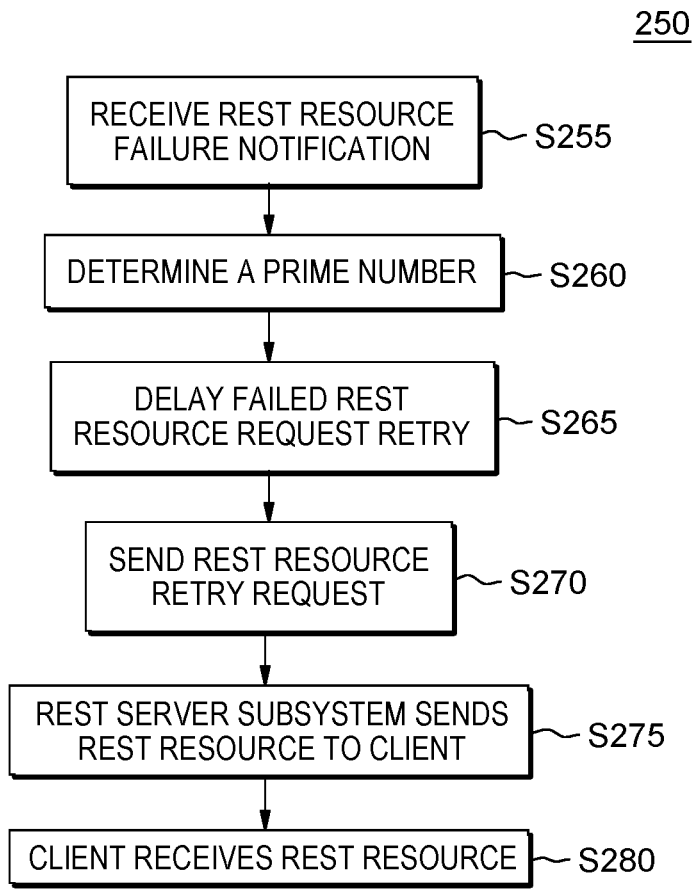
FIG. 2 is a flowchart showing a first embodiment method performed, at least in part, by the first embodiment system.
Figure 3:
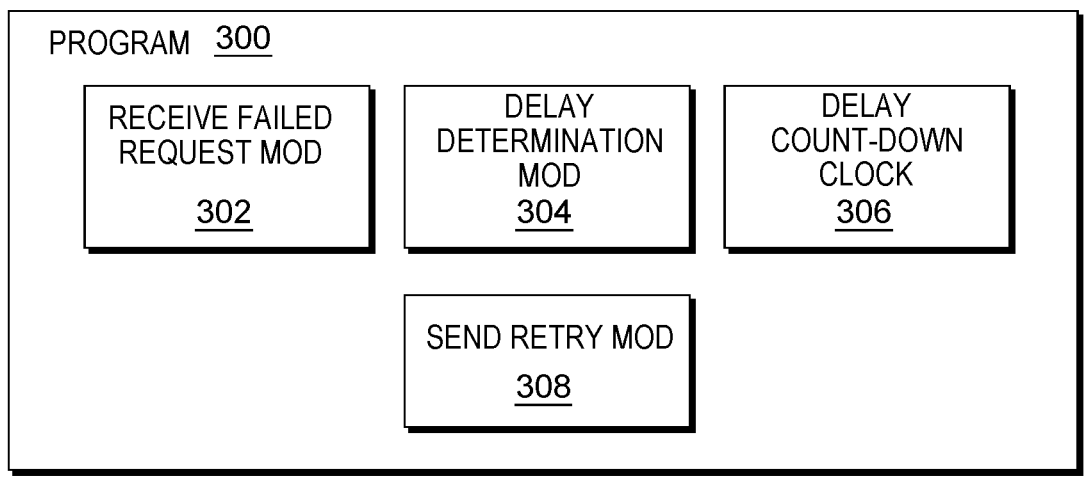
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3. In this example of FIGS. 1 to 3, the retry logic is on a computer that is interposed between the client side and the server side. Alternatively, for many applications, it may be preferred to include this retry logic on the client side (for example, on the device of the user who is making a request).

Processing begins at operation S255, where receive failed request module ("mod") 302 receives a first representation state transfer (REST) resource retry request from REST server subsystem 104 and over communication network 114. In this example, the REST resource retry request is sent because: (i) client subsystem sent a client request (in hypertext transfer protocol (HTTP)) for REST API 105; (ii) the request failed at REST server subsystem 104 due to a collision, or for some other reason (of a type of reason now known or to be encountered in the future); and (iii) in response, the REST server subsystem sends the first REST resource retry request to mod 302 of retry delay subsystem 102. This particular example focusses on errors caused by operation of the server. However, The REST failure status does not depend on the server alone. A failure could also occur due to the client side detecting a failure (like a lack of server response, dropped network packets, etc.). In short, the failure reason can be: (i) from the server state (that is, the application server gives a reason for failure such as a rate limit, or an internal error, or just a "no answer 404" error); or (ii) network failure due to load, congestion, network errors, or the like, that does not give a reason from the server, which is to say, it could be caused by the network provider. The upshot is that it is generally better to logically locate the retry logic as close to the requester device as feasible, and, in many embodiments, this means that the retry logic goes right on the requester device itself.

REST API 105 is a REST resource that is indicated by its uniform resource identifier (URI) address. In this example, the REST resource retry request is the result of a client request sent directly from client subsystem 106 to REST server subsystem 104. Alternatively, the REST resource retry request may result from failure of a previous retry request sent from retry delay subsystem 102 to REST server subsystem because the original request failed, and further because one, or more, retry requests also failed.

In this example, the retry delay subsystem is hosted on computer(s) that are separate from both the client subsystems and the REST server subsystem. Alternatively, the retry delay subsystem may be: (i) located, in whole or in part, on computer(s) that belong to the REST server subsystem; and/or (ii) located, in whole or in part, on computer(s) that belong to client subsystems 106, 108, 110 and 112 (for example, as part of browsers incorporated into the respective client subsystems).

Processing proceeds to operation S260, where delay determination mod 304 determines a prime number to be used as the number of time units to delay before a retry request is made in response to the earlier failed request. In the machine logic of mod 304 in simple example: (i) the first prime number selected in response to the first REST resource retry request received, is 7; (ii) the second prime number selected in response to the second REST resource retry request received, is 13; (iii) the third prime number selected in response to the third REST resource retry request received, is 19; (iv) the fourth prime number selected in response to the fourth REST resource retry request received, is 29; and (v) subsequent retries repeatedly cycle back through these four prime numbers in order. Of course, other embodiments are not restricted to a list of four (4) primes. The list of primes is (in theory) limitless and is only limited by the maximum length of time units the system to support (that is, if the max time is 1000 ms, then all primes less than 1000 are in the list. Other examples for selecting prime numbers (that is, exclusively selecting prime numbers) may be discussed in the following sub-section of this Detailed Description section.

It is noted that the number selected will always invariably be a prime number, in contradistinction to currently convention delay or backoff systems where the number of time units to delay is often selected to be a composite number In this example of flowchart 250, the REST resource retry request received at operation S255 is the third such request that has been received by retry delay subsystem 102, meaning that the selected prime number will be 19.

Alternatively, other algorithms for selecting prime numbers, to use as delay backoff times, may be used so long as the algorithms always lead to the selection of a prime number, as opposed to a composite number. Some of these may be explained in the following subsection of this Detailed Description section. For example, conventional binary exponential backoff algorithms or conventional truncated binary exponential backoff algorithms may be adjusted so that they exclusively use prime numbers as their backoff times.

As another example of a method to select prime numbers to use for a delay time, in another example embodiment, after c collisions: (i) a random integer number of slot times between 7 and $2^c+9$ is chosen; (ii) the random integer is re-chosen if it is not prime; and (iii) the previous operation is repeated until a prime integer has been selected. In this method, as the number of retry attempts increases, the number of possibilities for delay increases exponentially (or at least approximately exponentially).

Processing proceeds to operation S265, where delay countdown clock 306 causes the retry to be delayed for 19 time units, in accordance with the prime number selected at operation S260. In this example, the time units used are "slots," meaning that the retry is delayed for a period of 19 slots. As a further example, the retry could be measured in other time units, such as half-seconds (for example, a delay of 19 half-seconds is 9.5 seconds. Other possible delay periods will be discussed in the following subsection of this Detailed Description section.

Processing proceeds to operation S270 where send retry mod 308 sends a first REST resource retry request, corresponding to the first REST resource to a REST server system.

Processing proceeds to operation S275 where the REST server subsystem sends the REST resource to the client in response to the retried request. The REST server subsystem sends the resource because there is no collision this time (in this example). If there were another collision, then processing would loop back to operation S255 of flowchart 250.

Processing proceeds to operation S280 where the client receives the requested resource, previously sent at operation S275.

III. Further Comments and/or Embodiments

Some embodiments of the present invention recognize the following facts, potential problems and/or potential areas for improvement with respect to the current state of the art: (i) REST Service calls may fail due to various reasons, etc.; (ii) in most cases, the service needs to be called again (costs money); (iii) as discussed, above, in the Background section, various retry strategies exist to manage retry frequency; (iv) if multiple clients retry simultaneously, collisions may occur; and/or (v) if some service retries every 50 ms (milliseconds) and others every 100 ms, the probability is relatively large and that these competing service retry this will collide often.

Some embodiments of the present invention may include one, or more, of the following operations, features, characteristics and/or advantages: (i) the use of prime numbers in service retry collision prevention reduces the probability of overlap/collisions; (ii) prime numbers are divisible only by themselves, meaning that the probability of the periods of two different prime numbers M and N overlapping is $1/(M*N)$; (iii) the use of prime numbers to set time intervals for service retry calls minimizes the probability of collisions in service retry libraries; (iv) the use of prime numbers to set time intervals for service retry calls minimizes the total number of calls consumed compared to currently conventional methods of setting these intervals; (v) comparable or better than existing art on total time taken to complete all calls; (vi) some embodiments may include shared nothing retry logic that guarantees better performance verses other methods; (vii) some embodiments may include client managed independent retry strategies, each using the same prime numbers list; and/or (viii) some embodiments may include using prime number service call retry time intervals to significantly reduce the service call (for example, REST service call) collisions.

A method according to an embodiment of the present invention includes the following operations (not necessarily in the following order): (i) try the service; (ii) if it succeeds, do nothing; (iii) if it fails, continue; (iv) choose a random prime number between 1 and 997 inclusive (a larger prime can be used) using a uniform distribution; (v) use the chosen number in a retry back-off strategy (instead of an exponential number based on retry attempt); and (vi) every time there is a back-off, choose a new prime number as above. In this embodiment, the attempt number does not affect the random prime number being chosen.

Some embodiments of the present invention may include one, or more, of the following operations, features, characteristics and/or advantages: (i) the clients are uncoordinated and chooses a random prime to get minimal overlap/collisions; and (ii) client-side API retry logic library includes application code calling any REST API can use the retry library as a wrapper.

Some embodiments of the present invention may include one, or more, of the following operations, features, characteristics and/or advantages: (i) some embodiments operate at the networking level (specifically the API level, in other words, a machine learning model, serverless API call, etc.) that experiences high client traffic; (ii) in some embodiments multiple clients are trying to invoke a service on an API (such as a Watson Natural language classifier Model API); (iii) collisions do occur if too many API clients invoke a service at the same time (seen as server time-out's, try again); (iv) the algorithm better "dovetails" time-sensitive API calls without requiring extra horizontal scaling of hardware—the same cloud infrastructure can more quickly handle more requests with the same or less hardware; and/or (v) uses prime numbers and collisions in the context of API calls (as opposed to encryption of user logins or secure communication with a database).

A method according to an embodiment of the present invention includes the following operations (not necessarily in the following order): (i) receive a first REST API service call for a first REST API service; (ii) responsive to the receipt of the first REST API service call, make an initial attempt to invoke the first REST API service; (iii) determine that the initial attempt to invoke the REST API service has failed; (iv) responsive to the determination that the initial attempt has failed, choose a first random prime number; (v) use the chosen number in a retry back-off strategy (instead of an exponential number based on retry attempt); (vi) for every back-off, choose a new random prime number as above, such that he attempt number does not affect the random prime number being chosen; and (vii) the first random prime number is chosen using a uniform distribution.

Some embodiments of the present invention may include one, or more, of the following operations, features, characteristics and/or advantages: (i) applies back-off window lengths that are relatively prime to one another, which directly helps alleviate future collisions; (ii) some embodiments may prove that a prime number method is substantially better than random back-off; (iii) subtly as well, a shared medium like a radio frequency can only handle one concurrent call, APIs calls can occur in parallel unless they are overloading the system; (iv) some embodiments focus where parallel invocations are allowed, unless they fail; (v) wait times for retransmissions are not calculated, a random prime number is selected; (vi) in some embodiments, using prime numbers aims to obtain lower collision counts and highest throughput, and does not optimize for constant back-off time; (vii) some embodiments prove empirically that a prime number method is substantially better than fixed/predetermined window back-off lengths; (viii) some embodiments focus on web service API endpoints and reducing load on servers; (ix) explicitly relies on prime numbers to greatly improve performance; (x) applies back-off window lengths that are relatively prime to one another, which directly helps alleviate future collisions; (xi) in some embodiments implementation proves empirically that a prime number method is substantially better than random back-off; (xii) in some embodiments, random prime numbers are simply selected; and/or (xiii) some embodiments may not need other computation resources in order to predict a better result.

It is noted that at least some embodiments of the present invention are not restricted to REST API calls used by ML models. The novel methods disclosed herein will work for any REST API and not just Machine Learning models. For example, the REST API could be something simple like "Temperature in London" and it returns a response in Celsius. Some embodiments can manage retry logic on this service, too—for example, consider a scenario where 10 million clients call this service via mobile phones. In some embodiments, classification and regression, related to ML, are supported, but not all embodiments are restricted to just these ML paradigms—at least some embodiments support any REST API. In the ML paradigm, possible modalities include: classification, regression, association models, recommender models, clustering models, segmentation models, and/or any other ML modality.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving, from a REST server system, a plurality of representation state transfer (REST) resource fail notification, with each REST resource fail notification corresponding to an REST resource request that failed; and
for each given REST resource fail notification of the plurality of REST resource fail notifications:
determining a respectively associated delay time for the given REST resource fail notification, with all delay times being determined to be a number of time units that is a prime number,
delaying, for the respectively associated delay time, sending a REST resource retry request corresponding to the given REST resource fail notification, and
subsequent to the delaying of the sending of the REST resource retry request corresponding to the given REST resource fail notification, sending, to the REST server system, the REST resource retry request corresponding to the given REST resource fail notification.

2. The CIM of claim 1 wherein the REST resource retry request corresponding to each given REST resource fail notification of the plurality of REST resource fail notifications is a request for a REST application programming interface (API).

3. The CIM of claim 1 further comprising:
responsive to receipt of a first REST resource request corresponding to a first REST fail notification of the plurality of REST resource fail notifications, sending, from the REST server system, over a communication network and to a first client system, a first REST resource.

4. The CIM of claim 1 wherein each determination of a delay time for a respectively associated REST resource retry request includes choosing a random prime number.

5. The CIM of claim 4 wherein the random prime numbers have a uniform distribution.

6. The CIM of claim 1 wherein at least some of the determinations of delay times are based, at least in part, upon previously determined delay times associated with previous REST resource fail notifications.

7. The CIM of claim 1 wherein each REST resource retry request is composed according to hypertext transfer protocol (HTTP).

8. A computer-implemented method (CIM) comprising:
receiving, from a REST server system, a first representation state transfer (REST) resource fail notification corresponding to a first REST resource request that failed;
receiving a prime number set including a plurality of prime numbers, wherein the prime number set does not include any composite numbers;
selecting a selected prime number from the prime number set;
delaying, for the selected prime number of time units, sending a first REST resource retry request corresponding to the first REST fail notification; and
subsequent to the delaying of the sending of the first REST resource retry request, sending, to the REST server system, the first REST resource retry request.

9. The CIM of claim 8 wherein the first REST resource retry is a request for a REST application programming interface (API).

10. The CIM of claim 8 further comprising:
responsive to receipt of the first REST resource retry request, sending, from the REST server system, over a communication network and to a first client system, a first REST resource.

11. The CIM of claim 8 wherein the selection of the selected prime number is performed at random.

12. The CIM of claim 11 wherein the prime numbers of the prime number set have a uniform distribution.

13. The CIM of claim 8 wherein the first REST retry request is composed according to hypertext transfer protocol (HTTP).

14. A computer-implemented method (CIM) comprising:
receiving, from a REST server system, a first representation state transfer (REST) resource fail notification corresponding to a first REST resource request that failed;
applying machine logic to select a selected number with the machine logic being structured and/or programmed so that the selected number necessarily being a prime number;
delaying, for the selected number of time units, sending a first REST resource retry request corresponding to the first REST resource fail notification; and
subsequent to the delaying of the sending of the first REST resource retry request, sending, to a REST server system, the first REST resource retry request.

15. The CIM of claim 14 wherein the first REST resource retry is a request for a REST application programming interface (API).

16. The CIM of claim 14 further comprising:
responsive to the first REST resource retry request, sending, from the REST server system, over a communication network and to a first client system, a first REST resource.

17. The CIM of claim 15 wherein the selection of the selected number is performed at random from a plurality of prime number candidates.

18. The CIM of claim 17 wherein the prime numbers of the plurality of prime number candidates have a uniform distribution.

19. The CIM of claim 14 wherein the first rest retry request is composed according to hypertext transfer protocol (HTTP).

* * * * *